Patented June 12, 1934

1,962,496

UNITED STATES PATENT OFFICE 1,962,496

GLASS COMPOSITION

Elbert E. Fisher, St. Louis, Mo., assignor to National Pigments and Chemical Company, St. Louis, Mo., a corporation of Missouri No Drawing. Application December 14, 1931, Serial No. 581,073

7 Claims. (Cl. 106—36.1)

This invention relates generally to glass and particularly to a glass producing batch, the constituents of which are so selected and proportioned as to permit working of the glass at a temperature considerably lower than that heretofore possible and to improve the characteristics of the resultant glass.

It has generally been recognized that the underlying cause of solubility in the glass which is ordinarily employed for windows, bottles and the like has been the presence of alkali and many efforts have heretofore been made to sufficiently reduce the amount of sodium salt incorporated in a glass producing batch that the solubility will be reduced appreciably. Among the more or less successful steps which have been made toward the reduction of solubility of glass is the discovery described and claimed in my prior Letters Patent 1,665,693, issued April 10, 1928, in which a substantial proportion of the alkali content of a glass batch is eliminated by the use of barium sulphate. Although in the use of the invention described and claimed in the aforementioned patent, a substantial reduction in the solubility of the resultant glass has been achieved and the fluxing temperature of the batch has been substantially lowered, there, nevertheless, exists room for improvement in these characteristics which it is among the objects of this invention to accomplish.

The object of this invention generally stated is to provide a glass batch having a substantially low fluxing temperature and in which the alkali content is reduced to a minimum.

Another object of this invention is to provide a glass batch, including as an initial ingredient thereof, barium oxide.

A further object of this invention is to provide a glass batch in which a substantial portion of the usual alkali content is replaced by a material having a tendency to reduce the solubility, lower the fluxing temperature, decrease the coefficient of expansion and generally to overcome the disadvantageous features, the cause of which is generally recognized to be the alkali content of the batch.

A more specific object of this invention is to provide a glass producing batch in which a substantial portion of the usual alkali content is replaced by a mixture of barium sulphate and barium oxide.

Other objects will become apparent to those skilled in the art when the following description of this invention is read and understood. It is to be understood, however, that the invention is not limited to the specific proportions of the particular batch constituents to be hereinafter enumerated and that the use of this invention is not limited to the particular batch formula hereinafter referred to for the purpose of illustration.

In accordance with the present invention which may, for the purpose of illustration, be described with reference to what may be considered as conventional sand-soda-lime glass batch formula, to-wit:

Sand _____ 100 pounds
Limestone _____ 25 pounds
Soda ash _____ 35 pounds

The present invention contemplates a reduction of the alkali content of such a glass batch as that referred to above, for instance, by replacing as much as 10 pounds or more of the soda ash ($NaCO_3$) content of the batch, with what may be referred to, as barium oxide mixture. Such a barium oxide mixture as is contemplated by this invention may comprise a mixture of barium oxide with another barium salt, for instance, barium sulphate. The relative proportions of the barium oxide and barium sulphate may be varied to meet particular circumstances of operation, but under most circumstances a mixture containing between 40% and 60% barium oxide and between 60% and 40% barium sulphate will be found to produce advantageous results. Accordingly, the conventional batch formula given, for illustrative purposes, above may be modified in accordance with this invention as follows:

Sand _____ 100 pounds
Limestone _____ 25 pounds
Soda ash _____ 25 pounds
Barium oxide _____ } 10 pounds
Barium sulphate _____ }

With a substantial portion of the alkali content, which may be either soda ash or salt cake or both, replaced by the barium mixture referred to above and including as a constituent thereof, a substantial proportion of barium oxide, which may be either highly refined or slightly contaminated, it being preferable that a pure, free form of barium oxide be employed, it is obvious that the alkalinity of the resultant glass produced from a batch, the constituents of which are selected and proportioned in accordance with the present invention, such as for instance as given above, it has been found that the fluxing temperature will ordinarily be reduced as much as 200° F. which of course results in an enormous economy of fuel. Furthermore, glass resulting from batches compounded in accordance with the present invention has shown a solubility of less than 0.003.

A feature of particular importance is the fact that glasses resulting from batches compounded in accordance with the present invention show an extremely low coefficient of thermal expansion, the glass being extremely tough and durable and not subject to devitrification upon repeated thermal changes. It is obvious that a glass having such qualities as these is well adapted for the manufacture of baking and cooking utensils which must be repeatedly subjected to substantially high temperatures.

From the foregoing description it is apparent that a glass producing batch, the constituents of which are selected and proportioned in accordance with the present invention, will produce a glass having highly desirable characteristics and at the same time accomplish a substantial saving in the fuel necessary to heat the glass to the working temperature. It is to be distinctly understood, however, that the invention is not limited in its application to that particular conventional batch formula which has been hereinbefore referred to for the purpose of illustration, but that the invention is applicable to any conventional glass formula, the proportions of the various constituents of which may vary slightly from that given for illustrative purposes above, and it is to be understood, therefore, that this invention contemplates the use of barium oxide, either pure or contaminated, as an initial batch constituent, and particularly the use of such barium oxide in combination with a substantial quantity of another barium salt for replacing a substantial proportion of the alkali content which would otherwise enter into the batch. It is apparent that many modifications of the batch constituents hereinbefore described will present themselves to those skilled in the art which will not depart from the spirit of this invention and it is to be distinctly understood, therefore, that such modifications and the use of this invention in modified or other conventional batch formulae than that hereinbefore referred to are contemplated by and within the scope of the appended claims.

Having thus described the invention, what is claimed is:

1. A sand-soda-lime glass forming batch containing barium oxide as an initial ingredient thereof.

2. A sand-soda-lime glass forming batch containig barium oxide and barium sulphate as initial ingredients thereof.

3. A sand-soda-lime glass forming batch including a barium salt as an ingredient thereof, and containing a substantial quantity of barium oxide.

4. A constituent for a glass forming batch comprising a barium salt and barium oxide.

5. A constituent for a glass forming batch comprising 40-60% barium salt and 60-40% barium oxide.

6. A constituent for a glass forming batch comprising barium sulphate and barium oxide.

7. A constituent for a glass forming batch comprising 40-60% barium sulphate and 60-40% barium oxide.

ELBERT E. FISHER.